(12) United States Patent
Sugimae et al.

(10) Patent No.: US 8,609,763 B2
(45) Date of Patent: Dec. 17, 2013

(54) RESIN COMPOSITION FOR VIBRATION DAMPING MATERIAL AND VIBRATION DAMPING MATERIAL

(75) Inventors: Toshio Sugimae, Sakura (JP); Kiyohiro Inoue, Sakura (JP); Yasushi Taguchi, Sakura (JP)

(73) Assignee: Koatsu Gas Kogyo Co., Ltd., Osaka (JP)

( * ) Notice: Subject to any disclaimer, the term of this patent is extended or adjusted under 35 U.S.C. 154(b) by 478 days.

(21) Appl. No.: 12/439,494

(22) PCT Filed: Aug. 29, 2007

(86) PCT No.: PCT/JP2007/066782
§ 371 (c)(1),
(2), (4) Date: Feb. 27, 2009

(87) PCT Pub. No.: WO2008/026645
PCT Pub. Date: Mar. 6, 2008

(65) Prior Publication Data
US 2010/0010107 A1      Jan. 14, 2010

(30) Foreign Application Priority Data

Aug. 30, 2006    (JP) ................................. 2006-233774

(51) Int. Cl.
*C08L 23/28* (2006.01)
*C08L 33/04* (2006.01)
*C08L 101/02* (2006.01)

(52) U.S. Cl.
USPC ............. 525/50; 525/191; 525/209; 525/210; 525/216; 525/241

(58) Field of Classification Search
USPC .......... 428/221; 427/447, 487; 524/847, 445, 524/519; 521/70; 525/50, 55, 191, 209, 525/210, 216, 241
See application file for complete search history.

(56) References Cited

U.S. PATENT DOCUMENTS

| | | | |
|---|---|---|---|
| 3,833,404 A * | 9/1974 | Sperling et al. ............... | 428/413 |
| 4,588,774 A | 5/1986 | Dean | |
| 4,623,586 A | 11/1986 | Umeya et al. | |
| 6,686,033 B1 * | 2/2004 | Chacko ......................... | 428/221 |
| 2004/0082721 A1 | 4/2004 | Miura et al. | |
| 2004/0087721 A1 | 5/2004 | Bruhn et al. | |

FOREIGN PATENT DOCUMENTS

| | | |
|---|---|---|
| DE | 33 37 526 A1 | 5/1984 |
| DE | 10223047 A1 | 12/2003 |
| JP | 59-70559 A | 4/1984 |
| JP | 64-48951 A | 2/1989 |
| JP | 5-65382 A | 3/1993 |
| JP | 6-128492 A | 5/1994 |
| JP | 6-158747 A | 6/1994 |
| JP | 7-26784 A | 1/1995 |
| JP | 8-61003 A | 3/1996 |
| JP | 9-302139 A | 11/1997 |
| JP | 2001-152028 A | 6/2001 |
| JP | 2005-255800 A | 9/2005 |
| JP | 2006-199759 A | 8/2006 |
| WO | WO-01/32777 A1 | 5/2001 |
| WO | WO-2006/077757 A1 | 7/2006 |

OTHER PUBLICATIONS

Brandup, J. et al Polymer Handbook 4th Edtiion John Wiley and Sons, 1999, pp. VI/210-VI/211.*
Extended European Search Report dated Oct. 13, 2010 for European Patent Application No. 07806259.3.

* cited by examiner

*Primary Examiner* — Irina S Zemel
*Assistant Examiner* — Jeffrey Lenihan
(74) *Attorney, Agent, or Firm* — Birch, Stewart, Kolash & Birch, LLP

(57) ABSTRACT

A resin composition for vibration damping material for a vibration damping material exhibiting high vibration damping performance in a wider temperature range and a vibration damping material using the same are provided. The resin composition contains 100 parts by weight of a resin component A as a matrix and 5 to 300 parts by weight of a resin component B dispersed in the matrix. The resin component B has two or more cyclic structures selected from the group consisting of an aromatic hydrocarbon group, an aliphatic cyclic hydrocarbon group, and a heteroaromatic group, and is in a glassy state at use temperature.

10 Claims, No Drawings

RESIN COMPOSITION FOR VIBRATION DAMPING MATERIAL AND VIBRATION DAMPING MATERIAL

The present invention relates to a resin composition for vibration damping material for use in products that generate noise due to vibration, such as automobiles, interior materials, metallic roofs, building materials, household electrical appliances, motors, and metal products, to dampen mechanical vibration and noise and a vibration damping material.

BACKGROUND OF THE INVENTION

A vibration damping mechanism is broadly classified into a mechanism based on the mass law and a mechanism based on energy conversion. In the case of the method based on the mass law, a material large in mass, such as lead, is used, and a higher vibration damping effect can be obtained by using a material larger in mass. However, the method based on the mass law is limited in its application because products using this method are heavy.

On the other hand, the method based on energy conversion utilizes viscoelasticity of a polymer. Vibration damping with polymer utilizes the function of a polymer to convert external vibration energy to thermal energy and release generated heat into the outside to eliminate the vibration energy. However, such a vibration damping effect is obtained only at temperatures near the glass transition temperature (Tg) of the polymer. That is, a conventional vibration damping material using a polymer involves a problem that a usable temperature range within which the vibration damping material exhibits a high loss factor (tan δ) required for vibration damping is narrow.

Whereas, in order to broaden the temperature range within which vibration damping performance is exhibited, blending of two or more polymers having a large difference in glass transition temperature has been conventionally carried out. However, when polymers blended are incompatible, a loss factor peak (hereinafter, referred to as a "temperature peak") is observed at the glass transition temperature of each of the polymers, and therefore a wide temperature peak cannot be achieved. On the other hand, when polymers blended are compatible, a single temperature peak is observed. Consequently, an attempt to design a semi-compatible polymer blend has been made. Such a semi-compatible polymer blend has a wider temperature peak, but involves a problem that the height of the temperature peak is lowered to deteriorate vibration damping performance.

Further, there are proposed a method in which an interpenetrating polymer network is formed by two or more polymers and a method in which a compatibilizing agent is added to incompatible resins (Japanese Patent Application Laid-open No. 2001-152028). According to these methods, a wider temperature peak can be achieved, but there is a problem that the height of the temperature peak is lowered to deteriorate vibration damping performance.

Furthermore, there are also proposed a method in which a low-molecular weight compound having three or more cyclic structures is added to a polymer (Japanese Patent Application Laid-open No. 5-65382) and a method in which a low-molecular weight compound that increases dipole moment is added (Japanese Patent Application Laid-open No. 9-302139). However, these methods involve a problem that crystallization or bleeding of the low-molecular weight compound occurs.

Further, there is also a method in which an inorganic filler is added to a polymer to convert vibration energy to frictional heat to dampen the vibration energy. However, this method involves a problem that the loss factor of the resin is lowered due to addition of the inorganic filler.

Further, there is also a method for reducing the weight of a material by forming a porous structure. A porous vibration damping material has improved sound absorbency, but the vibration damping performance thereof based on the mass law is lowered due to a reduced weight. In addition, pores in the porous vibration damping material do not contribute to energy conversion, and therefore the porous vibration damping material cannot have an increased loss factor.

Further, there is also proposed a vibration control method using antiphase vibration generated by an actuator (Japanese Patent Application Laid-open No. 7-26784, Japanese Patent Application Laid-open No. 6-158747, Japanese Patent Application Laid-open No. 8-61003). However, the method involves a problem that a large-scale device such as a speaker and a vibration generator are required.

SUMMARY OF THE INVENTION

Consequently, in order to solve the above problems, it is an object of the present invention to provide a resin composition for vibration damping material for a vibration damping material exhibiting high vibration damping performance in a wider temperature range and a vibration damping material using such a resin composition for vibration damping material.

The present inventors have found that a reduction in loss factor can be suppressed in a wide temperature range by dispersing, in a matrix resin, a resin component which has two or more cyclic structures and which is in a glassy state at use temperature, without forming the resin component into a film. This finding has led to the completion of the present invention.

That is, the present invention is directed to a resin composition for vibration damping material, including: 100 parts by weight of a resin component A as a matrix; and 5 to 300 parts by weight of a resin component B dispersed in the matrix, in which the resin component B has two or more cyclic structures selected from the group consisting of an aromatic hydrocarbon group, an aliphatic cyclic hydrocarbon group, and a heteroaromatic group, and is in a glassy state at use temperature.

The reason why a reduction in the loss factor of the resin composition for vibration damping material according to the present invention is suppressed in a wide temperature range is not clear, but a possible reason is as follows.

The resin component B has two or more cyclic structures. Therefore, it can be considered that such cyclic structures cause steric hindrance for forming a dense structure so that the resin component B is spatially sparsely present. For this reason, it can be considered that the resin component B starts rotational movement, translational movement, or vibration even at a temperature equal to or less than the glass transition temperature thereof and becomes easy to move even at a temperature equal to or less than the glass transition temperature thereof due to its high spatial degree of freedom and then comes into an intermediate state between a glassy state and a rubbery state, which results in suppressing a reduction in the loss factor in a wide temperature range.

Further, the resin component B of the resin composition according to the present invention may have a number average molecular weight of 400 to 8000.

Further, the resin composition according to the present invention may be of an aqueous emulsion type. In recent years, a vibration damping material using a paint-type resin composition for vibration damping material has been developed. This is because the paint-type resin composition for vibration damping material can also be applied onto an intricately-shaped object to be vibrationally controlled and can be easily applied onto an object to be vibrationally controlled. As such a paint-type resin composition, from the viewpoint of environmental issues, an aqueous emulsion-type resin composition using water instead of an organic solvent has been studied. However, in the case of an aqueous emulsion-type resin composition, a film forming temperature and a glass transition temperature are close to each other, and therefore there is a case where when two kinds of polymers are blended, film formation is impossible at a temperature equal to or less than a glass transition temperature. For example, in a case where the temperature peak of loss factor is about 20° C., a minimum film forming temperature also becomes about 20° C. In this case, film formation is impossible in winter. Whereas, the resin composition according to the present invention contains the resin component B dispersed therein like a filler, and therefore the resin component B does not inhibit the formation of a film of the matrix resin. On the other hand, a filler suppresses the thermal movement of a matrix resin so that the glass transition temperature of a resin composition is increased. Therefore, it can be considered that the temperature peak of the resin composition shifts toward high temperature, which makes it possible to form a film at a temperature lower than a temperature at which the temperature peak is given.

Further, the resin composition according to the present invention may also include 50 to 300 parts by weight of a first filler having an aspect ratio of 10 or more with respect to 100 parts by weight of the resin component A and 1 to 100 parts by weight of a second filler having an aspect ratio of less than 10 with respect to 100 parts by weight of the resin component A. In this case, the first filler may have a major-axis length of 100 nm or less or a thickness or minor-axis length of 50 nm or less.

In general, addition of a filler reduces a loss factor. This is because energy conversion of vibration energy to thermal energy is enhanced by friction, but energy conversion based on glass transition is reduced due to a reduced resin content. However, addition of the first filler and the second filler having different aspect ratios makes it possible to further increase a loss factor. It can be considered that such an effect which has not been previously reported is produced by the following damping mechanism. Addition of the first and second fillers makes it possible to provide three elements, that is, a flat filler, a fulcrum, and free space, and therefore a structure which creates a phase opposite to that of external vibration, such as a seesaw structure, is formed so that vibration is eliminated. Such a vibration damping mechanism using antiphase vibration is achieved not by the mass law or energy conversion but by energy cancellation, and is therefore less temperature-dependent and most effective. In this case, it can be considered that the first filler corresponds to a flat filler and the second filler functions as a fulcrum.

Further, the resin composition according to the present invention may also include a cross-linking agent for cross-linking the resin component A. By cross-linking the resin component A, it is possible to improve the heat resistance of the resin composition.

The present invention is also directed to a vibration damping material obtained by molding a resin composition containing 100 parts by weight of a resin component A as a matrix and 5 to 300 parts by weight of a resin component B dispersed in the matrix, the resin component B having two or more monocyclic and/or polycyclic structures selected from the group consisting of an aromatic hydrocarbon group, an aliphatic cyclic hydrocarbon group, and a heteroaromatic group and being in a glassy state at use temperature.

Further, the vibration damping material according to the present invention may include 50 to 300 parts by weight of a first filler having an aspect ratio of 10 or more with respect to 100 parts by weight of the resin component A and 1 to 100 parts by weight of a second filler having an aspect ratio of less than 10 with respect to 100 parts by weight of the resin component A.

Furthermore, the vibration damping material according to the present invention may have an extent of foaming of 5 to 500%.

According to the present invention, since a resin component is used which has two or more cyclic structures and which is in a glassy state at use temperature is dispersed in a matrix, it is possible to provide a vibration damping material exhibiting improved vibration damping performance in a wider temperature range.

DETAILED DESCRIPTION OF THE PREFERRED EMBODIMENTS

Hereinbelow, an embodiment of the present invention will be described in detail.

A resin composition for vibration damping material according to the present invention includes 100 parts by weight of a resin component A as a matrix and 5 to 300 parts by weight of a resin component B dispersed in the matrix. The resin component B has two or more cyclic structures selected from the group consisting of an aromatic hydrocarbon group, an aliphatic cyclic hydrocarbon group, and a heteroaromatic group, and is in a glassy state at use temperature.

Examples of the resin component A to be used as a matrix include polymers such as polyvinyl chloride, chlorinated polyethylene, chlorinated polypropylene, polyethylene, polypropylene, polyvinyl acetate, a vinyl acetate-based copolymer, a (meth)acrylic copolymer, a styrene acrylic resin, polyvinylidene fluoride, polyisoprene, an acrylonitrile-butadiene rubber, a styrene-butadiene rubber, a butadiene rubber, a natural rubber, an isoprene rubber, polystyrene, a styrene acrylic copolymer, polyester, polyurethane, and polyamide. Among these polymers, a (meth)acrylic copolymer, a styrene acrylic resin, and chlorinated polyethylene are preferred.

The resin component B to be used has two or more cyclic structures selected from the group consisting of an aromatic hydrocarbon group, an aliphatic cyclic hydrocarbon group, and a heteroaromatic group, and is in a glassy state at use temperature. The term "cyclic structure" as used herein refers to a monocyclic compound or a polycyclic compound such as a condensed polycyclic compound obtained by condensing two or more monocyclic compounds, a bridged polycyclic compound, or a spiro polycyclic compound. In the present invention, the phrase "resin component B has two or more cyclic structures" means that when the resin component B is a homopolymer, the repeating unit thereof contains any one of a compound obtained by coupling two or more monocyclic compounds via a single bond or a double bond, one polycyclic compound, and a compound obtained by coupling one or more monocyclic compounds and one polycyclic compound via a single bond or a double bond, and that when the resin component B is a copolymer, the repeating unit of each copolymerizable component contains any one of one monocyclic compound, a compound obtained by coupling two or more monocyclic compounds via a single bond or a double bond, one polycyclic compound, and a compound obtained by coupling one or more monocyclic compounds and one polycyclic compound via a single bond or a double bond.

A specific example of a monocyclic compound containing an aromatic hydrocarbon group includes a phenyl group which may have a substituent group. Specific examples of a polycyclic compound containing an aromatic hydrocarbon group include such as a naphthyl group, an anthryl group, a phenanthryl group, a tetrahydronaphthyl group, a 9,10-dihydroanthryl group, and an acetonaphthyl group, each of which may have a substituent group. Further, specific examples of a monocyclic compound containing an aliphatic cyclic hydrocarbon group include a cyclohexyl group, a cyclopentyl group, a cyclopropyl group, a cyclobutyl group, and an isoboronyl group, each of which may have a substituent group, and a cyclohexenyl group, a cyclopentenyl group, a cyclopropenyl group, and a cyclobutenyl group, each of which has an endocyclic double bond. Examples of a polycyclic compound containing an aliphatic cyclic hydrocarbon group include monocyclo, bicyclo, tricyclo, tetracyclo, and pentacyclo structures, each of which has 5 or more carbon atoms and may have a substituent group, and specific examples thereof include such as a dicyclopentenyl group and a norbornenyl group. Further, specific examples of a monocyclic compound containing a heteroaromatic group include a pyrrolyl group, a furyl group, a thienyl group, an imidazolyl group, a maleimide group, an oxazolyl group, a thiazolyl group, a thiadiazolyl group, a pyrazolyl group, an isoxazolyl group, an isothiazolyl group, a pyridyl group, a pyridazyl group, a pyrimidinyl group, a pyrazonyl group, a piperidyl group, a piperazyl group, and a morpholyl group. Specific examples of a polycyclic compound containing a heteroaromatic group include such as a benzofuryl group, an isobenzofuryl group, a benzothienyl group, a benzotriazolyl group, an isobenzothienyl group, an indolyl group, an isoindolyl group, a benzoimidazolyl group, a benzothiazolyl group, a benzoxazolyl group, a quinazolinyl group, and a naphthyridinyl group, each of which may have a substituent group. Further, the "aliphatic cyclic hydrocarbon group" also includes alicyclic terpenes such as α-pinene, β-pinene, limonene, camphene, an abietic acid group, terpinolene, terpinene, phellandrene, α-carotene, β-carotene, and γ-carotene. The phrase "two or more monocyclic compounds" used herein is not limited to a combination of the same kind of monocyclic compounds, and also includes a combination of two or more different kinds of monocyclic compounds. Further, examples of the substituent group include such as an alkyl group having 1 to 4 carbon atoms, a halogen atom, a cyano group, a hydroxyl group, a nitro group, an alkoxyl group, a carboxyl group, an amino group, and an amide group.

The resin component B is preferably a copolymer containing at least one monomer component having the above-described monocyclic compound and/or polycyclic compound in its main chain or side chain, and is more preferably a copolymer of a monomer having the above-described monocyclic compound and/or polycyclic compound in its main chain or side chain and at least one copolymerizable monomer selected from the group consisting of a styrene-based monomer, an acrylic monomer, and maleic anhydride. More preferably, the copolymer contains a styrene-based monomer as an essential copolymerizable monomer and further contains an acrylic monomer or maleic anhydride as a copolymerizable monomer. More preferred examples of the monomer containing the above-described monocyclic compound and/or polycyclic compound include vinylnaphthalene, naphthalene maleate, N-phenylmaleimide, N-(4-hydroxyphenyl)maleimide, cyclic mercaptan, a reaction product between mercaptobenzothiazole and chloromethylstyrene, and a reaction product between dicyclopentenyl(meth)acrylate or bismuthiol and chloromethylstyrene. More preferred are N-phenylmaleimide, cyclic mercaptan, a reaction product between mercaptobenzothiazole and chloromethylstyrene, and a reaction product between dicyclopentenyl(meth)acrylate or bismuthiol and chloromethylstyrene.

Here, examples of the styrene-based monomer include such as styrene, α-methylstyrene, and vinyl toluene. Examples of the acrylic monomer include (meth)acrylate, (meth)acrylic acid, and (meth)acrylamides and (meth)acrylate is preferred. Examples of the (meth)acrylate include alkyl (meth)acrylates having 1 to 16 carbon atoms such as methyl (meth)acrylate and hydroxyl group-containing (meth)acrylates such as 2-hydroxylethyl(meth)acrylate.

The number average molecular weight of the resin component B is preferably 400 to 8000, and more preferably 600 to 3000. If it is larger than 8000, the resin component B is likely to inhibit the movement of the matrix, and if it is less than 400, bleeding or separation occurs.

Further, the resin component B needs to be in a glassy state at use temperature. In a case where the use temperature is in the range of −10 to 50° C., the glass transition temperature of the resin component B is in the range of 50 to 180° C. In a case where the use temperature is in the range of 20 to 80° C., the glass transition temperature of the resin component B is in the range of 80 to 200° C. In a case where the use temperature is in the range of 50 to 100° C., the glass transition temperature of the resin component B is in the range of 150 to 200° C.

Further, examples of a method for dispersing the resin component B in the matrix include a method in which the matrix is kneaded with the resin component B using a kneading means such as a heat roller and a method in which an emulsion or resin powder containing the resin component B is added to and mixed with a resin emulsion or resin solution containing the matrix.

In the present invention, a first filler having an aspect ratio (defined as major-axis length of filler/thickness of filler) of 10 or more and a second filler having an aspect ratio of less than 10 can be used. Here, the first filler preferably has an aspect ratio of 100 or more. As the first and second fillers, a needle-shaped filler or a plate-shaped filler can be used. Examples of the plate-shaped filler include hydrotalcite, kaoline, halloysite, talc, mica, sericite, smectite, vermiculite, and graphite, and one or more of them can be used. The "smectite" used herein includes montmorillonite, saponite, beidellite, nontronite, and tektite. Further, examples of the needle-shaped filler include glass fibers, whiskers such as aluminum borate, carbon fibers, and synthetic staple fibers such as vinylon fibers.

Further, the major-axis length of the first filler is preferably 100 nm or less, or the thickness or minor-axis length of the first filler is preferably 50 nm or less. If the major-axis length is larger than 100 nm, it is difficult to achieve vibration control by antiphase vibration.

The first filler is added preferably in an amount of 5 to 300 parts by weight, and more preferably in an amount of 20 to 200 parts by weight with respect to 100 parts by weight of the matrix. If the amount is less than 5 parts by weight, the effect of the present invention cannot be sufficiently obtained, and if the amount exceeds 300 parts by weight, a friction effect is enhanced but the effect of the present invention cannot be obtained due to too high a density of the first filler. Further, the second filler is added preferably in an amount of 1 to 100 parts by weight, and more preferably in an amount of 5 to 50 parts by weight with respect to 100 parts by weight of the matrix.

Herein, the reason why a needle-shaped or plate-shaped filler is used as the first and second fillers is as follows. When a force is exerted on a spherical filler, the spherical filler moves in one direction (i.e., the dynamic degree of freedom is 1), however, in a case where a force is exerted on a needle-shaped or plate-shaped filler, it is possible to move the filler in a direction relatively opposite to the direction of the force depending on the position where the force is exerted or the relationship with other components. That is, a needle-shaped or plate-shaped filler has a high degree of freedom of movement. This results from a difference in dynamic degree of freedom between a spherical object and a needle-shaped or plate-shaped object. For this reason, it can be considered that vibration energy can be cancelled by a complex movement of a needle-shaped or plate-shaped filler due to its high degree of freedom.

Further, a cross-linking agent may also be added in order to cross-link the resin component A used as a matrix. In general, cross-linkage of the resin component A makes it possible to improve the heat resistance of a vibration damping material, but at the same time, reduces the loss factor of the vibration damping material. However, according to the present invention, a use of at least one cross-linking agent selected from the group consisting of an isocyanate compound, an epoxy compound, and a metal oxide makes it possible to suppress a reduction in loss factor as well as to improve heat resistance. Such a cross-linking agent reacts with a matrix having, as a cross-linkable reactive group, a hydroxyl group, a carboxyl group, an amino group, an epoxy group, an isocyanate group, or an acid anhydride group. For example, in a case where a hydroxyl group-containing acrylic copolymer is used as a matrix, an isocyanate compound is preferably used, and in a case where a carboxyl group-containing acrylic copolymer is used as a matrix, an epoxy compound or a metal oxide is preferably used.

The isocyanate compound is a compound having two or more isocyanate groups in its molecule. Examples of the isocyanate compound include aliphatic polyisocyanates such as tetramethylene diisocyanate and hexamethylene diisocyanate, alicyclic polyisocyanates such as cyclohexylene diisocyanate, dicyclohexylmethane diisocyanate, isophoron diisocyanate, and isocyanomethyl cyclohexane, and aromatic polyisocyanates such as phenylene diisocyanate, tolylene diisocyanate, naphthylene diisocyanate, diphenylmethane diisocyanate, and xylylene diisocyanate. Preferably, a polyisocyanate oligomer which is a diisocyanate compound derivative is used. Further, the epoxy compound is a polyvalent epoxy compound having two or more epoxy groups in its molecule. Examples of the epoxy compound include bisphenol-type epoxy compounds, novolac-type epoxy compounds, polyglycidyl ethers, and polyglycidyl amines. Examples of an acid anhydride compound include aromatic acid anhydrides such as phthalic anhydride, alicyclic acid anhydrides such as maleic anhydride, and aliphatic acid anhydrides such as polyadipic anhydride. These cross-linking agents may be used alone or in combination of two or more of them. Further, a catalyst may also be used to enhance the reactivity between the matrix and the cross-linking agent.

Further, the filler to be used is preferably a magnetic, dielectric, or piezoelectric filler. When the filler is a magnetic, dielectric, or piezoelectric filler, it is more preferable since a force having an electrically or magnetically opposite phase is generated in addition to a spatially or geometrically opposite phase or phase shift so that the effect of the present invention is enhanced.

The resin composition for vibration damping material according to the present invention can be formed into various shapes to be used as a vibration damping material. For example, in a case where the resin composition is formed into a sheet shape by hot press or the like, it may be singly used as an unconstrained type vibration damping material or may be interposed between constraining layers, which are less likely to be deformed, to produce a constrained type vibration damping material. Alternatively, the resin composition may also be used as a paint-type resin composition, which can be applied onto substrates having various shapes to form a coating film, and the thus obtained complex of the resin composition and the substrate can be used.

Further, in a case where the paint-type resin composition is used, the resin component A and/or the resin component B are/is preferably in the form of an aqueous resin emulsion. The aqueous resin emulsion can be prepared by a well-known polymerization method such as emulsion polymerization.

Further, the resin composition for vibration damping material according to the present invention may be foamed during molding to produce as a foamed vibration damping material. Foaming can be caused by a well-known method such as a method using mechanical stirring to cause foaming, a method using a foaming agent that generates gas bubbles by heating, a method utilizing the boiling point of water or an organic solvent to cause foaming, or a method using a gas generated by reaction such as urea reaction. The foamed vibration damping material preferably has an extent of foaming of 5 to 500%, and more preferably 5 to 300%. If the extent of foaming is less than 5%, the effect of improving vibration damping performance obtained by increasing voids is not sufficient, and if the extent of foaming exceeds 500%, vibration damping performance is degraded due to a reduced resin content.

In general, the vibration damping mechanism based on the mass law is achieved by suppressing the movement of a substrate by a weight, and therefore a more sufficient vibration damping effect can be obtained in the absence of voids such as air bubbles. On the other hand, in the case of the vibration damping mechanism based on energy conversion, a vibration damping material itself needs to be moved to some extent to convert external vibration energy to another form of energy. In this case, when the vibration damping material is moved in the same direction as external vibration, a vibration damping effect obtained by energy conversion is small. However, according to the present invention, vibration damping is achieved not only by (1) conversion of vibration energy to thermal energy due to viscoelasticity of a resin component and (2) conversion of vibration energy to friction heat due to addition of a filler but also by (3) cancellation of external vibration energy due to the antiphase effect of the filler, which occurs in concert with the above (1). More specifically, the effect of cancelling external vibration energy is obtained by the antiphase effect of the filler produced by foaming the matrix itself to increase voids so that the matrix itself can be easily moved in the same direction as external vibration to induce the seesaw action of the filler. Such a vibration damping method is different from a conventional vibration damping method based on the mass law or energy conversion and is innovative in that the antiphase effect of the filler is produced by allowing the matrix to be smoothly moved by forming voids in the matrix.

EXAMPLES

Hereinbelow, the present invention will be described with reference to the following examples. However, the present invention is not limited to these examples.

Example 1

Chlorinated polyethylene (glass transition temperature: about −20° C.) having a degree of chlorination of 30% was used as a matrix. A powdered copolymer (hereinafter, referred to as "A-1") (number average molecular weight: 2000) obtained by copolymerizing a monomer obtained by reacting p-chloromethyl styrene (CMS-14, manufactured by Seimi Chemical Co., Ltd.) with bismuthiol, styrene, and methacrylic acid was used as a resin component B. The glass transition temperature of the resin component B was 115° C. 100 parts by weight of the matrix and 20 parts by weight of A-1 were mixed together and kneaded using a heat roller at 70° C. to obtain a kneaded mixture. Then, the kneaded mixture was hot-pressed at a temperature at which A-1 was kept in a glassy state (100° C.) to produce a film.

Example 2

A chlorinated polyolefin solution having a chlorine content of 32% (Superchlon 773H) was used as a matrix. 100 parts by weight of the matrix and 20 parts by weight of A-1 were dispersed in toluene, and then solvent removal was performed to obtain a film.

Example 3

An ethylene-vinyl acetate copolymer resin emulsion (Sumika Flex 450HQ manufactured by Sumika Chemtex Co., Ltd., glass transition temperature: 0° C.) was used as a matrix. A styrene-methacrylic acid ester-dicyclopentenyl acrylate copolymer emulsion having a number average molecular weight of 7500 (glass transition temperature: 105° C.) was used as a resin component B. 100 parts by weight of the matrix and 20 parts by weight of the resin component B were mixed together and dried at ordinary temperature to obtain a film.

Example 4

A methyl methacrylate/methyl acrylate/ethyl acrylate/acrylic acid copolymer emulsion having a glass transition temperature of –5° C. was used as a matrix. A styrene-methacrylic acid ester-dicyclopentenyl acrylate copolymer emulsion (glass transition temperature: 105° C.) having a number average molecular weight of 2000 was used as a resin component B. 100 parts by weight of the matrix and 20 parts by weight of the resin component B were mixed together and dried at ordinary temperature to obtain a film.

Example 5

A methyl methacrylate/methyl acrylate/ethyl acrylate/acrylic acid copolymer emulsion having a glass transition temperature of –5° C. was used as a matrix. A styrene-methacrylic acid ester-dicyclopentenyl acrylate copolymer emulsion (glass transition temperature: 105° C.) having a number average molecular weight of 2000 was used as a resin component B. 100 parts by weight of the matrix, 20 parts by weight of the resin component B, 100 parts by weight of mica (PDM10B, manufactured by TOPY Industries, Ltd., aspect ratio: 50, thickness: 50 nm), and 10 parts by weight of calcium carbonate (aspect ratio: 10 or less) were mixed together and dried at ordinary temperature to obtain a film.

Example 6

A methyl methacrylate/methyl acrylate/ethyl acrylate/acrylic acid copolymer emulsion having a glass transition temperature of –5° C. was used as a matrix. An α-methylstyrene-methyl methacrylate-dicyclopentenyl acrylate copolymer emulsion (glass transition temperature: 90° C., number average molecular weight: 1000) was used as a resin component B. 100 parts by weight of the matrix, 30 parts by weight of the resin component B, 100 parts by weight of mica (PDM10B, manufactured by TOPY Industries, Ltd., aspect ratio: 50, thickness: 50 nm), 10 parts by weight of clay (aspect ratio: 10 or less), and 4 parts by weight of a foaming agent Pelex TA (manufactured by Kao Corporation) were mixed together and stirred to cause foaming. In this state, the mixture was dried at ordinary temperature to obtain a film containing bubbles. The extent of foaming was 30%.

Example 7

A methyl methacrylate/methyl acrylate/ethyl acrylate/acrylic acid copolymer emulsion having a glass transition temperature of –5° C. was used as a matrix. An α-methylstyrene-methyl methacrylate-dicyclopentenyl acrylate copolymer emulsion (glass transition temperature: 90° C., number average molecular weight: 1000) was used as a resin component B. 100 parts by weight of the matrix, 30 parts by weight of the resin component B, 95 parts by weight of mica (PDM10B, manufactured by TOPY Industries, Ltd., aspect ratio: 50, thickness: 50 nm), 5 parts by weight of swelling mica (Somasif ME-100, manufactured by Coop Chemical, aspect ratio: about 1000, thickness: about 10 nm), 10 parts by weight of calcium carbonate, and 4 parts by weight of a foaming agent Pelex TA (manufactured by Kao Corporation) were mixed together and stirred to cause foaming. In this state, the mixture was dried at ordinary temperature to obtain a film containing bubbles. The extent of foaming was 200%.

Example 8

A methyl methacrylate/methyl acrylate/ethyl acrylate/2-hydroxyethyl methacrylate/acrylic acid copolymer emulsion having a glass transition temperature of –5° C. was used as a matrix. An α-methyl styrene-methyl methacrylate-dicyclopentenyl acrylate copolymer emulsion (glass transition temperature: 90° C., number average molecular weight: 1000) was used as a resin component B. 100 parts by weight of the matrix, 30 parts by weight of the resin component B, 100 parts by weight of mica (PDM10B, manufactured by TOPY Industries, Ltd., aspect ratio: 50, thickness: 50 nm), and 3 parts by weight of an isocyanate-based cross-linking agent (Burnock DNW-5000) were mixed together and dried at ordinary temperature to obtain a film.

Example 9

A methyl methacrylate/methyl acrylate/ethyl acrylate/acrylic acid copolymer emulsion having a glass transition temperature of –5° C. was used as a matrix. An α-methyl styrene-methyl methacrylate-dicyclopentenyl acrylate copolymer resin (glass transition temperature: 90° C., number average molecular weight: 1000) was used as a resin component B. 100 parts by weight of the matrix, 30 parts by weight of the resin component B, 100 parts by weight of mica, and 2 parts by weight of an epoxy-based cross-linking agent DENACOL EX212L (manufactured by Nagase Chemtex Corporation) were mixed together and dried at ordinary temperature to obtain a film.

Example 10

A methyl methacrylate/methyl acrylate/ethyl acrylate/acrylic acid copolymer emulsion having a glass transition temperature of −5° C. was used as a matrix. A styrene-methacrylic acid ester-naphthalene maleate copolymer emulsion (glass transition temperature: 125° C., number average molecular weight: 2000) was used as a resin component B. 100 parts by weight of the matrix and 20 parts by weight of the resin component B were mixed together and dried at ordinary temperature to obtain a film.

Example 11

A methyl methacrylate/methyl acrylate/ethyl acrylate/acrylic acid copolymer emulsion having a glass transition temperature of −5° C. was used as a matrix. A methacrylic acid ester/dicyclopentenyl methacrylate copolymer emulsion (glass transition temperature: 120° C., number average molecular weight: 2000) was used as a resin component B. 100 parts by weight of the matrix and 20 parts by weight of the resin component B were mixed together and dried at ordinary temperature to obtain a film.

Comparative Example 1

Chlorinated polyethylene having a degree of chlorination of 30% (glass transition temperature: about −20° C.) was used as a matrix. 100 parts by weight of the matrix and 20 parts by weight of butyl rubber (glass transition temperature: about −36° C.) were mixed together and kneaded at 70° C. using a heat roller to obtain a kneaded mixture. Then, the kneaded mixture was hot-pressed at a temperature at which A-1 was in a rubbery state (120° C.) to produce a film.

Comparative Example 2

A chlorinated polyolefin solution having a chlorine content of 32% (Superchlon 773H) was used as a matrix. 100 parts by weight of the matrix and 20 parts by weight of a methyl methacrylate-styrene copolymer emulsion (glass transition temperature: 105° C.) were mixed together, and then solvent removal was performed to obtain a film. The film was heat-treated at 120° C. for 10 minutes.

Comparative Example 3

Sumika Flex 450HQ (manufactured by Sumika Chemtex Co., Ltd., glass transition temperature: 0° C.) was used as a matrix. 100 parts by weight of the matrix and 20 parts by weight of a styrene-butyl acrylate-dicyclopentenyl acrylate copolymer emulsion (glass transition temperature: 0° C.) were mixed together and dried at room temperature to obtain a film.

Comparative Example 4

A styrene/butyl acrylate emulsion (glass transition temperature: 10° C.) and a styrene-butyl acrylate copolymer emulsion (glass transition temperature: 40° C.) were blended together in a usual manner to broaden a glass transition range, and then an obtained blend was dried at 30° C. to obtain a film. Film formation was impossible at 0° C.

Comparative Example 5

Chlorinated polyethylene (glass transition temperature: −20° C.) having a degree of chlorination of 30% was used as a matrix. 100 parts by weight of the matrix and 80 parts by weight of diphenylbenzene (molecular weight: 230) were mixed together and kneaded at 70° C. using a heat roller to obtain a kneaded mixture. The kneaded mixture was hot-pressed at 100° C. to produce a film.

Comparative Example 6

A methyl methacrylate/methyl acrylate/ethyl acrylate/acrylic acid copolymer emulsion having a glass transition temperature of −5° C. was used as a matrix. A methacrylic acid ester-dicyclopentenyl methacrylate copolymer emulsion (glass transition temperature: 120° C., number average molecular weight: 12000) was used as a resin component B. 100 parts by weight of the matrix and 20 parts by weight of the resin component B were mixed together and dried at ordinary temperature to obtain a film.

Comparative Example 7

A methyl methacrylate/methyl acrylate/ethyl acrylate/acrylic acid copolymer emulsion having a glass transition temperature of −5° C. was used as a matrix. 100 parts by weight of the matrix, 30 parts by weight of an α-methyl styrene-methyl methacrylate-dicyclopentenyl acrylate copolymer emulsion (glass transition temperature: 90° C., number average molecular weight: 1000), 95 parts by weight of mica (PDM10B, manufactured by TOPY Industries, Ltd., aspect ratio: 50, thickness: 50 nm), 5 parts by weight of swelling mica (Somasif ME-100, manufactured by Coop Chemical, aspect ratio: about 1000, thickness: about 10 nm), 10 parts by weight of calcium carbonate, and 8 parts by weight of a foaming agent Pelex TA (manufactured by Kao Corporation) were mixed together and stirred to cause foaming. In this state, the mixture was dried at ordinary temperature to obtain a film containing bubbles. The extent of foaming was 600%.

(Method for Evaluating Vibration Damping Performance)

Measurement of loss factor was carried out by a cantilever beam vibration test using a loss factor measuring instrument (B&K 3550) of the Government Industrial Research Institute of Nagoya. The paint-type vibration damping material obtained in each of the above Examples and Comparative Examples was applied onto an aluminum plate having a size of 130×10×1 mm to obtain a test specimen. The coated area of the vibration damping material was 130×10 mm. The loss factor of the vibration damping material was calculated by a half-value width method and converted at a frequency of 300 Hz. The thus obtained results are shown in Table 1.

(Measurement of Extent of Foaming)

The extent of foaming was calculated using a formula

[(pre-foaming specific gravity−post-foaming specific gravity)/(pre-foaming specific gravity)]×100(%).
The specific gravity of the resin composition
used was calculated from the measured weight
and volume thereof.

TABLE 1

| | Loss factor Measurement temperature | | | | |
|---|---|---|---|---|---|
| | 10° C. | 20° C. | 30° C. | 40° C. | 50° C. |
| Example 1 | 0.18 | 0.2 | 0.22 | 0.18 | 0.15 |
| Example 2 | 0.16 | 0.18 | 0.2 | 0.21 | 0.17 |
| Example 3 | 0.2 | 0.23 | 0.21 | 0.18 | 0.16 |
| Example 4 | 0.22 | 0.24 | 0.23 | 0.20 | 0.18 |
| Example 5 | 0.23 | 0.25 | 0.24 | 0.22 | 0.2 |
| Example 6 | 0.24 | 0.27 | 0.26 | 0.23 | 0.2 |
| Example 7 | 0.24 | 0.27 | 0.26 | 0.24 | 0.23 |
| Example 8 | 0.22 | 0.24 | 0.26 | 0.25 | 0.22 |

TABLE 1-continued

| | Loss factor Measurement temperature | | | | |
|---|---|---|---|---|---|
| | 10° C. | 20° C. | 30° C. | 40° C. | 50° C. |
| Example 9 | 0.21 | 0.23 | 0.26 | 0.24 | 0.21 |
| Example 10 | 0.21 | 0.23 | 0.23 | 0.21 | 0.18 |
| Example 11 | 0.21 | 0.23 | 0.23 | 0.20 | 0.18 |
| Comparative Example 1 | 0.09 | 0.09 | 0.08 | 0.05 | 0.03 |
| Comparative Example 2 | 0.03 | 0.03 | 0.04 | 0.04 | 0.05 |
| Comparative Example 3 | 0.12 | 0.07 | 0.04 | 0.03 | 0.02 |
| Comparative Example 4 | 0.11 | 0.12 | 0.11 | 0.12 | 0.11 |
| Comparative Example 5 | 0.08 | 0.12 | 0.18 | 0.09 | 0.04 |
| Comparative Example 6 | 0.15 | 0.16 | 0.15 | 0.12 | 0.11 |
| Comparative Example 7 | 0.08 | 0.20 | 0.11 | 0.18 | 0.08 |

Each of the vibration damping materials in Examples had a high loss factor of 0.15 to 0.27 at temperatures in the range of 10 to 50° C. From the result, it was confirmed that the vibration damping materials of Examples had high vibration damping capability. On the other hand, each of the vibration damping materials of Comparative Examples had a low loss factor of 0.12 or less. The vibration damping material of Comparative Example 1 had a sea-island structure composed of chlorinated polyethylene and a butyl rubber as a discontinuous phase (island phase), but the butyl rubber was in a rubbery state. Further, in the case of Comparative Example 2, the resin component B was in a glassy state, but did not have two or more monocyclic and/or polycyclic compounds. Further, in the case of Comparative Example 3, the resin component B had two or more monocyclic compounds but was in a rubbery state at use temperature. Further, the vibration damping material of Comparative Example 4 obtained by a conventional blending method had a substantially constant loss factor in the measurement temperature range but the loss factor was low. Further, in the case of the vibration damping material of Comparative Example 5 obtained by using a low-molecular weight compound containing two monocyclic compounds, the loss factor thereof was dependent on temperature and the value thereof was also low. Further, the vibration damping material of Comparative Example 6 using the resin component B having a molecular weight of 12000 had a low loss factor over the entire measurement temperature range. Further, in the case of the vibration damping material of Comparative Example 7 having an extent of foaming of 600, the loss factor thereof was dependent on temperature and the value thereof was also low.

What is claimed is:

1. A resin composition for vibration damping material comprising:
    100 parts by weight of a resin component A as a matrix; and
    5 to 300 parts by weight of a resin component B dispersed in the matrix,
    wherein the resin component B has two or more cyclic structures selected from the group consisting of an aromatic hydrocarbon group, an aliphatic cyclic hydrocarbon group, and a heteroaromatic group and is in a glassy state at use temperature for vibration damping, and
    wherein the resin component A has a glass transition temperature lower than the use temperature for vibration damping, and the resin component B is semi-compatible with the resin component A and has a number average molecular weight of 400 to 8000;
    wherein the resin composition meets one of the following requirements:
        (i) the use temperature for vibration damping is −10 to 50° C. and a glass transition temperature of the resin component B is 50 to 180° C.;
        (ii) the use temperature for vibration damping is 20 to 80° C. and a glass transition temperature of the resin component B is 80 to 200° C.; and
        (iii) the use temperature for vibration damping is 50 to 100° C. and a glass transition temperature of the resin component B is 150 to 200° C.

2. The resin composition according to claim 1, wherein the resin component B is a copolymer containing at least one monomer component having a monocyclic compound and/or a polycyclic compound in a main chain or a side chain thereof.

3. The resin composition according to claim 1, wherein the resin composition is an aqueous emulsion-type resin composition.

4. The resin composition according to claim 1, further comprising 5 to 300 parts by weight of a first filler having an aspect ratio of 10 or more with respect to 100 parts by weight of the resin component A and 1 to 100 parts by weight of a second filler having an aspect ratio of less than 10 with respect to 100 parts by weight of the resin component A.

5. The resin composition according to claim 4, wherein the first filler has a major-axis length of 100 nm or less or a thickness or minor-axis length of 50 nm or less.

6. The resin composition according to claim 1, further comprising a cross-linking agent for cross-linking the resin component A.

7. A vibration damping material which is obtained by molding a resin composition containing 100 parts by weight of a resin component A as a matrix and 5 to 300 parts by weight of a resin component B dispersed in the matrix, the resin component B having two or more cyclic structures selected from the group consisting of an aromatic hydrocarbon group, an aliphatic cyclic hydrocarbon group, and a heteroaromatic group and being in a glassy state at use temperature for vibration damping,
    wherein the resin component A has a glass transition temperature lower than the use temperature for vibration damping, and the resin component B is semi-compatible with the resin component A and has a number average molecular weight of 400 to 8000;
    wherein the resin composition meets one of the following requirements:
        the use temperature for vibration damping is −10 to 50° C. and a glass transition temperature of the resin component B is 50 to 180° C.;
        (ii) the use temperature for vibration damping is 20 to 80° C. and a glass transition temperature of the resin component B is 80 to 200° C.; and
        (iii) the use temperature for vibration damping is 50 to 100° C. and a glass transition temperature of the resin component B is 150 to 200° C.

8. The vibration damping material according to claim 7, wherein the resin component B is a copolymer containing at least one monomer component having a monocyclic compound and/or a polycyclic compound in a main chain or a side chain thereof.

9. The vibration damping material according to claim 7, further comprising 5 to 300 parts by weight of a first filler having an aspect ratio of 10 or more with respect to 100 parts by weight of the resin component A and 1 to 100 parts by weight of a second filler having an aspect ratio of less than 10 with respect to 100 parts by weight of the resin component A.

10. The vibration damping material according to claim 7, wherein the vibration damping material has an extent of foaming of 5 to 500%.

* * * * *